United States Patent [19]

Fujiki et al.

[11] Patent Number: 5,349,037
[45] Date of Patent: Sep. 20, 1994

[54] ADHESIVE COMPOSITION

[75] Inventors: Hironao Fujiki; Kaoru Michimata, both of Takasaki; Takehide Okami, Annaka, all of Japan

[73] Assignee: Shin-Etsu Chemical Co., Ltd., Tokyo, Japan

[21] Appl. No.: 25,862

[22] Filed: Mar. 3, 1993

[30] Foreign Application Priority Data

Mar. 3, 1992 [JP] Japan .................................. 4-081663

[51] Int. Cl.$^5$ .............................................. C08G 77/06
[52] U.S. Cl. ......................................... 528/15; 528/42
[58] Field of Search ..................................... 528/15, 42

[56] References Cited

U.S. PATENT DOCUMENTS

| | | | |
|---|---|---|---|
| 4,968,766 | 11/1990 | Kendziorski | 528/42 |
| 4,980,440 | 12/1990 | Kendziorski et al. | 528/42 |
| 4,980,443 | 12/1990 | Kendziorski et al. | 528/42 |

*Primary Examiner*—Melvyn I. Marquis
*Attorney, Agent, or Firm*—Oblon, Spivak, McClelland, Maier & Neustadt

[57] ABSTRACT

An adhesion composition comprising:

(A) a high molecular weight fluorosilicone polymer containing the unit having the formula (1):

$$RfCH_2CH_2(CH_3)SiO— \qquad (1)$$

wherein Rf is a perfluoroalkyl group containing 1 to 8 carbon atoms, in an amount of 30 mol % or more in the molecule, and blocked with the vinyl group at the both ends, (B) a low molecular fluorosilicone polymer containing the unit having the formula (1) in an amount of 30 mol % or more in the molecule, and containing an average of 3 or more units having the following formula (2):

$$CH_2=CH(CH_3)SiO— \qquad (2),$$

(C) an organohydrogenpolysiloxane,
(D) an organosilane or organopolysiloxane having at least one hydrogen atom or alkenyl group bonded to a silicon atom and having at least one of the oxirane group, dialkoxysilyl groups or trialkoxysilyl groups, and
(E) a platinum catalyst. The cured product of the composition has good resistance to gasoline, and therefore useful for automobile parts.

9 Claims, 1 Drawing Sheet

F I G. 1
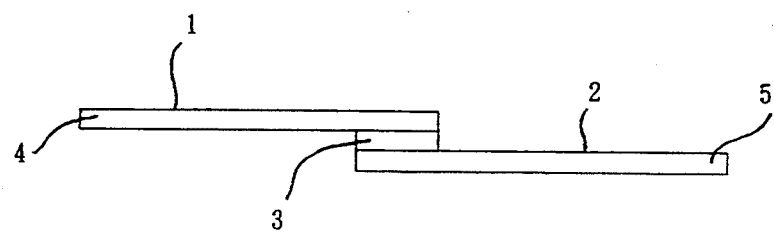

ADHESIVE COMPOSITION

BACKGROUND OF THE INVENTION

1. Field of the Invention

The present invention relates to an adhesive composition containing as the base component a fluorosilicone polymer.

2. Description of the Prior Art

In recent years, minuturization and high-performance are required for electric or electronic parts. For adhesives used for fixing these parts are also required to have improved performance in a variety of respects. For example, adhesives used for adhesion of automobile parts are required to have resistance to gasoline, machine oil and the like. If the adhered parts come into contact with gasoline or the like, they are required to retain long-term adhesion stability.

As such adhesives silicone adhesives are known. They are cured to form an elastomeric cured product and to be adhered to various adherends. The silicone adhesive compositions conventionally known are excellent in adhesion, weathering properties, chemical resistance, etc., but need improvement in solvent resistance to gasoline and the like.

SUMMARY OF THE INVENTION

Accordingly, an object of the present invention is to provide a silicone adhesive composition improved in solvent resistance to gasoline and the like.

According to the present invention, there is provided an adhesion composition comprising:

(A) a fluorosilicone polymer containing the unit having the following formula (1):

$$RfCH_2CH_2(CH_3)SiO— \qquad (1)$$

wherein Rf is a perfluoroalkyl group containing 1 to 8 carbon atoms, in an amount of 30 mol % or more on average in the molecule, blocked with the vinyl group at both ends of the molecular chain, and having a viscosity at 25° C. of 1,000 to 100,000 cSt, (B) a fluorosilicone polymer containing the unit having the formula (1) in an amount of 30 mol % or more on average in the molecule, containing an average of 3 or more units having the following formula (2):

$$CH_2=CH(CH_3)SiO— \qquad (2),$$

having an average polymerization degree of 10 or more, the average polymerization degree being defined as the number of SiO units contained in the molecule, and having a viscosity at 25° C. of 10 cSt or more but less than 1,000 cSt, (C) an organohydrogenpolysiloxane having an average of 2 or more of silicon-bonded hydrogen atoms, (D) an organosilane or organopolysiloxane having at least one hydrogen atom or alkenyl group bonded to a silicon atom and having at least one group selected from the group consisting of the oxirane group, dialkoxysilyl groups and trialkoxysilyl groups in the molecule, and (E) platinum or a platinum compound.

BRIEF DESCRIPTION OF THE DRAWING

The FIGURE shows a test specimen for testing the adhesive strength under shear of a composition according to the invention.

DETAILED DESCRIPTION OF PREFERRED EMBODIMENTS

Each component of the adhesive composition of the present invention will be described below in detail.

Component (A)

In the composition of the present invention, the fluorosilicone polymer of the component (A) is the base component, and need to contain 30 mol % or more, preferably 5 to 100 mole %, of the unit represented by the formula (1) on average in the molecule. If the content of said unit is less than 30 mol %, the object to improve the solvent resistance of the present invention can not be attained. Here, Rf in said formula (1) is a perfluoroalkyl group containing 1 to 8 carbon atoms, and preferably the perfluoromethyl group and perfluorooctyl groups.

In the fluorosilicone polymer of the component (A), it is important that vinyl groups are bonded to the silicon atoms at the both ends of the molecular chain; thereby the polymer can react with Si—H groups in the organohydrogenpolysiloxnae of the component (C) described below to form an elastmeric cured product.

In the fluorosilicone polymer, other groups which may be bonded to silicon atoms of other units than the units of the formula (1) described above include for example monovalent hydrocarbon groups containing 1 to 10 carbon atoms, specifically, such as methyl, ethyl, propyl, butyl, hexyl and the like; aryl groups such as phenyl and tolyl; cycloalkyl groups such as cyclohexyl; and aralkyl groups such as benzyl, 2-phenylethyl and the like. In the present invention, the most preferred is the methyl group.

The fluorosilicone polymer is required to have a viscosity at 25° C. of 1,000 to 100,000 cSt. If the viscosity is higher than the range above, workability is impaired; if lower than the range above, it is difficult to form a cured product having satisfactory mechanical properties.

The particularly preferred examples of the fluorosilicone polymer of the component (A) include the compounds represented by the formulas (3) to (6). Herein, Vi denotes the vinyl group, and in the formulas below n and m are each an integer of 1 or more.

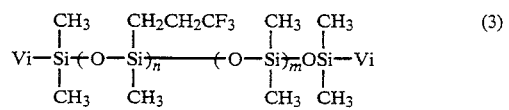

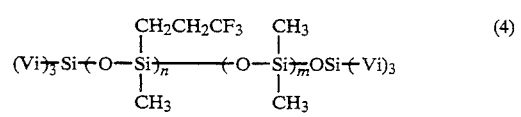

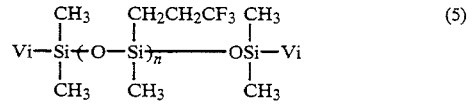

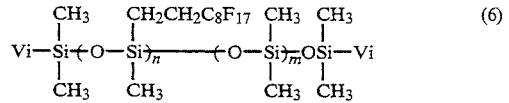

The fluorosilicone polymer described above can be produced by processes known per se, for example, by polymerizing tris(3,3,3-trifluoropropyl)cyclotrisiloxane using a lithium compound of the like as a catalyst and terminating the ends of the resulting polymer chain with a vinyldialkylsilyl group. Alternatively, it can also be produced by polymerizing tris(3,3,3-trifluoropropyl)cyclotrisiloxane and hexamethylcyclotrisiloxane, octamethylcyclotetrasiloxane or the like using an alkali metal catalyst such as a lithium compound and potassium hydroxide or an acidic catalyst such as sulfuric acid, methanesulfonic acid or trifluoromethanesulfonic acid, and terminating the ends of the resulting polymer chain with a vinyldialkylsilyl group. Further, out of the fluorosilicone polymers, embodiments having a perfluoroalkyl group containing a relatively large number of carbon atoms, such as perfluorooctyl, can be produced by, for example, synthesizing the cyclic product having the formula (7):

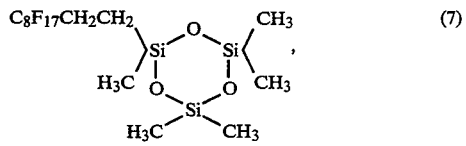     (7)

and ring-open polymerizing the cyclic product in a manner similar to the above.

Component (B)

The low molecular weight fluorosilicone polymer of the component (B) used in combination with said base component (A) give adherability or the function as an adhesive to the cured products formed by curing the composition.

Also this polymer is required to contain 30 mol % or more, preferably 50 to 98.5 mol %, of the unit represented by said formula (1) on average in the molecule. If the content of the unit is less than 30 mol %, the object of the present invention to improve the solvent resistance can not be attained.

The polymer (B) is required to contain at least 3 units represented by said formula (2) in the molecule. Since three units having the vinyl group are present in the molecule, the fluorosilicone polymer is incorporated into the cured product formed from the component (A) in a network state, thus contributing to improvement in adhesive properties.

In the low molecular fluorosilicone polymer, other groups which may be bonded to silicone atoms of other units than the unit described above include for example monovalent hydrocarbon groups containing 1 to 10 carbon atoms which are exemplified in respect of the fluorosilicone polymer of the component (A), and generally, the methyl group is preferred.

The low molecular weight fluorosilicone polymer is required to have an average polymerization degree, which is defined as the number of the SiO unit, of 10 or more, and a viscosity at 25° C. of 10 cSt or more but less than 1,000 cSt, preferably 50 cSt or more but less than 1,000 cSt. If the average polymerization degree is below the range above or the viscosity is less than 10 cSt at 25° C., the cured products are poor in physical strength and sufficient adhesion can be obtained with difficulty. If the viscosity is 1,000 cSt or more, although the resulting cured products have a satisfactory strength, its elasticity is impaired, resulting in that sufficient adhesion can be obtained with difficulty.

Suitable examples of the low molecular weight fluorosilicone polymer described above include, but are not limited to, the compounds represented by the formulas (8) to (10). In the formulas below, n and m are integer of 1 or more, and 1 is an integer of 3 or more.

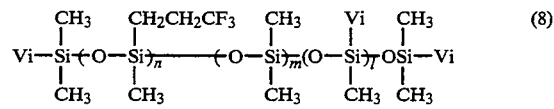     (8)

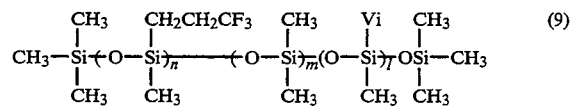     (9)

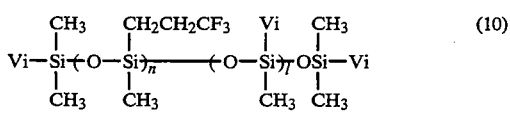     (10)

The low molecular weight fluorosilicone polymer (B) can also be produced in the same manner as described in respect of the fluorosilicone polymer of the component (A).

The fluorosilicone polymer of the component (B) is used in an amount of 1 to 30 parts by weight, particularly 1 to 10 parts by weight, per 100 parts by weight of the fluorosilicone polymer of the component (A).

Component (C)

The organohydrogenpolysiloxane used as the component (C) acts as a crosslinking agent. Silicon-bonded hydrogen atoms (i.e., Si-H group) in the molecule effect addition reaction with vinyl groups contained in the components (A) and (B) described above, and an elastomeric cured product is thereby formed. Therefore, the organohydrogenpolysiloxane is required to have an average of two or more silicon-bonded hydrogen atoms.

Such an organohydrogenpolysiloxane is known as the curing agent for compositions of this type, and may have any structure, for example, linear, cyclic or branched structure.

Suitable examples of the organohydrogenpolysiloxane include the compounds represented by the formulas (11) to (18) below. In the formulas below, Me denotes the methyl group, and p, q and r are an integer of 1 or more, with the exception that in the formulas (12), (14), (15), and (18) above, p is an integer of 2 or more.

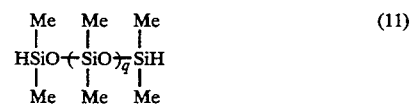     (11)

     (12)

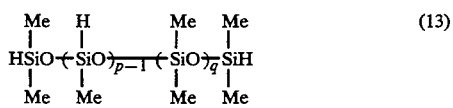     (13)

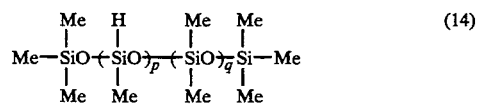     (14)

-continued

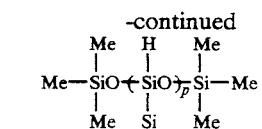
(15)

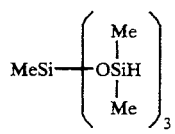
(16)

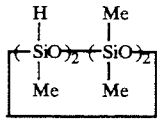
(17)

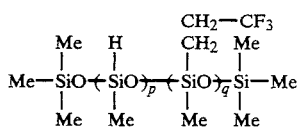
(18)

The organohydrogenpolysiloxane is blended preferably in an amount of 0.5 parts by weight or more per 100 parts by weight of the component (A), particularly preferably in such an amount that the total of the Si—H groups contained therein and the Si—H groups contained in the component (D) described below is 0.5 to 4.0 mol, more preferably 1 to 3 mol per mol of the entire alkenyl groups contained in the composition. If the amount of the Si—H groups is less than 0.5 mol, the crosslink density of the cured product obtained is too low, resulting in lowering of the strength of the cured adhesive and lowering of the heat resistance. The amount of the Si—H groups more than 4.0 mol may cause foaming problem due to dehydrogenation or lowering of the heat resistance.

Component (D)

In the present invention, the organosilane or organopolysiloxane of the component (D) acts as an adhesivity-imparting agent. For the function, it needs to contain at least one group selected from the group consisting of the oxirane group, dialkoxysilyl groups and trialkoxysilyl groups in the molecule. Thus, the cured product formed from the composition of the present invention has various polar groups dispersed on its surface, which enable the adhesion to various adherends to be maintained. As alkoxy groups in the dialkoxysilyl groups and trialkoxysilyl groups, preferred are methoxy, ethoxy, butoxy and the like, and particularly preferred is methoxy.

The component (D) is required to have at least one member selected from the group consisting of a silicon-bonded hydrogen atom and alkenyl group. Since this component contains such a hydrogen atom and/or alkenyl group in the molecule, it is incorporated into the cured product of the composition to form a structure wherein polar groups serving to offer adhesive properties are dispersed in the cured product.

The component (D) is blended normally in an amount of 0.1 to 30 parts by weight, preferably 1 to 15 parts by weight, per 100 parts by weight of the component (A). Too small an amount of the component (D) results in an unsatisfactory adhesive properties; too large an amount may result in poor heat resistance.

As the component (D), organopolysiloxanes are preferred, and their viscosity at 25° C. desirably ranges from 5 to 500 cSt. Suitable examples include the compounds represented by the formulas (18) to (31) below. In the formulas below, a, b and c are an integer of 1 or more.

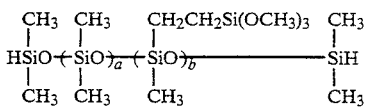
(19)

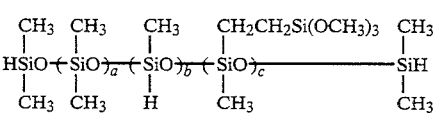
(20)

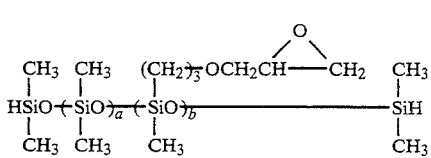
(21)

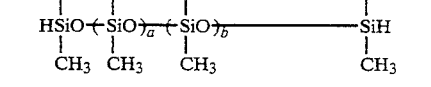
(22)

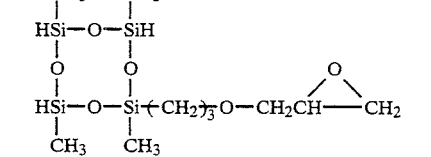
(23)

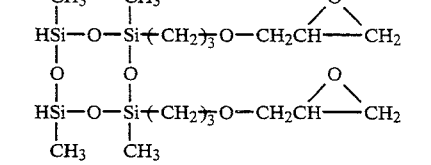
(24)

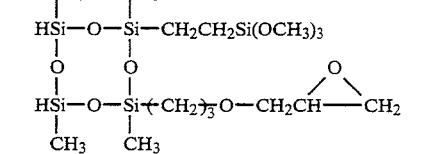
(25)

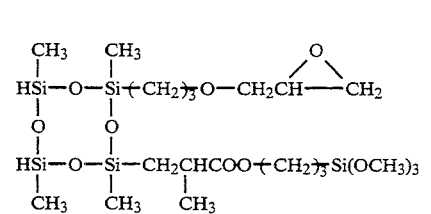
(26)

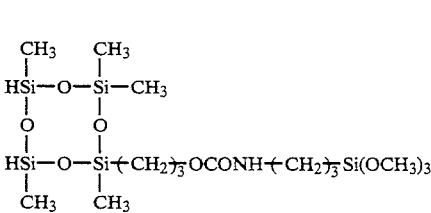
(27)

-continued

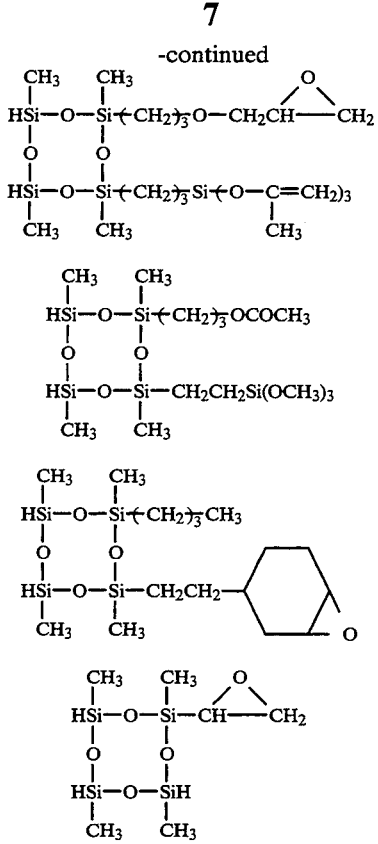

Component (E)

The component (E) is used to accelerate the addition curing reaction between the alkenyl group and the Si—H group described above, and are known as a curing catalyst of this type to those skilled in the art. The preferable examples thereof include platinum black, chloroplatinic acid, alcohol-modified products of chloroplatinic acid, complexes of chloroplatinic acid with an olefine, aldehyde, vinylsiloxane, acetylene alcohols or the like.

The component (E) may be added in the so-called catalytic amount, and is adjusted depending on the desired cure rate on the case by case basis. Normally, it is added in an amount of 0.1 to 500 ppm, preferably 1 to 200 ppm, most preferably 1 to 50 ppm, in terms of platinum based on the entire components.

Other Components

To the composition of the present invention, various additives other than the components described above can be added as long as the adhesive properties and the solvent resistance to gasoline or the like are not impaired.

For example, inorganic fillers such as fumed silica, precipitated silica and their products rendered hydrophobic, carbon black, powdered quartz, molten quartz, spherical silica, diatomaceous earth, zeolite, calcium carbonate, titanium dioxide, iron oxides, alumina, spherical alumina, aluminum hydroxide, aluminum nitride, magnesium sulfate and the like can be used for the purposes of reinforcing the strength, giving electric conductivity, extension, etc. Lead-based inorganic fillers such as lead carbonate, lead hydroxide or the like can be also used in order that radiation is shielded. Normally, the amount of the inorganic filler is set to be 600 parts by eight or less per 100 parts by weight of the total of the components (A) and (B). If the amount of the inorganic filler exceeds this range, the fluidity of the composition is impaired and can be used with difficulty, and adhesion is lowered.

Further, controlling agents for controlling the cure rate or shelf stability of the composition can be used, for example, vinyl-containing organopolysiloxanes such as methylvinylsiloxane; triallyl isocyanurate, alkyl maleates, acetylene alcohol, and silane or siloxane-modified products thereof; hydroperoxides; tetramethylethylene diamine; benzotriazole, etc., which may be used singly or in combination of two or more. The controlling agents are added preferably in an amount of 0.01 to 100,000 ppm.

Moreover, flame-retardants, pigments, adhesive aids, mildew proofing agents, viscosity controller, etc., may be added on the case by case basis depending on the purpose.

Adhesive Composition

The adhesive composition of the present invention can be prepared readily by mixing necessary components described above uniformly.

Cured products formed from the composition exhibit good adhesion and can adhere to various substrates firmly as well as exhibit good resistance to solvent such as gasoline, machine oil, and the like. Under the conditions that the cured products are in contact with such a solvent, stable adhesion is maintained for a long term.

EXAMPLES

In the Examples below, the silicone compounds below were used to prepare adhesive compositions.

Compound (1)

An organopolysiloxane having an average structure:

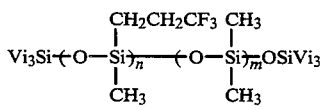

wherein n is 175 and m is 75, and having a viscosity at 25° C. of 6,000 cSt.

Compound (2)

An organopolysiloxane having an average structure:

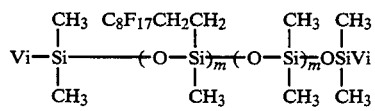

wherein n is 45 and m is 90, and having a viscosity at 25° C. of 5,000 cSt.

Compound (3)

An organopolysiloxane having an average structure:

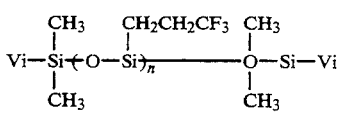

wherein n is 300, and having a viscosity at 25° C. of 8,000 cSt.

Compound (4)

An organopolysiloxane having an average structure:

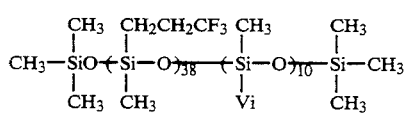

and having a viscosity at 25° C. of 800 cSt.

Compound (5)

An organohydrogenpolysiloxane having an average structure:

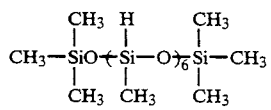

Compound (6)

An organopolysiloxane having the formula:

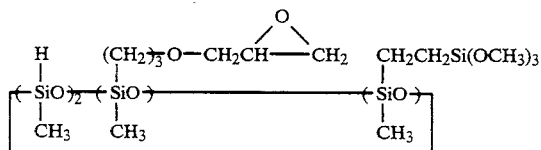

EXAMPLE 1

95 parts by weight of Compound (1), 5 parts by weight of compound (4) and 50 parts by weight of a silica powder with an average particle diameter of 15 μm were blended and mixed under stirring until the mixture became uniform. Subsequently, a chloroplatinic acid/propyl alcohol complex in an amount of 40 ppm in terms of platinum per 100 parts by weight of the total of Compounds (1) and (4) was added to the mixture. Further, 0.01 part by weight of 3-methyl-3-hydroxy-1-butine, 1.8 parts by weight of the organohydrogenpolysiloxane of Compound (5), and 3.0 parts by weight of Compound (6) were added, and the mixture obtained was mixed under stirring again until it became uniform, thus preparing an adhesive composition.

The composition was cast into a mold having a coating of Teflon with a thickness of 2 mm, and heated to cure at 120° C. for 60 minutes to produce a sheet. Dumbbell-shaped specimens were prepared from the sheet and tested for physical properties according to JIS K 6301.

A piece of said sheet was immersed in gasoline at 25° C. for 24 hours, and resulting volume change was measured.

FIG. 1 shows a test specimen for testing adhesive strength under shear. The composition above was provided between two aluminum plates 1 and 2 each measuring 100 mm×25 mm×2 mm at the ends of both plates as shown in FIG. 1, and then cured at 120° C. for 60 min., to prepare a test specimen. The cured composition layer 3 measured 25 mm×12.5 mm×2 mm (thickness). The ends 4 and 5 were pulled at a rate of 500 mm/min., in the opposite direction until the specimen broke. The pulling force when the specimen broke was measured. Adhesive strength under shear was obtained by dividing the value thus measured by the area of the cured composition layer 3 (25×12.5 mm$^2$).

EXAMPLES 2 AND 3, COMPARATIVE EXAMPLE 1

Adhesive compositions were prepared in the same manner as in Example 1 except that composition of components were changed as given in Table 1, and were tested for physical properties in the same manner as in Example 1.

TABLE 1

|  | Examples | | | Comparative |
| --- | --- | --- | --- | --- |
|  | Eg. 1 | Eg. 2 | Eg. 3 | Eg. 1 |
| Compound (1) | 95 | — | — | 95 |
| Compound (2) | — | 97 | — | — |
| Compound (3) | — | — | 90 | — |
| Compound (4) | 5 | 3 | 10 | — |
| Compound (5) | 1.8 | 1.8 | 1.8 | 1.8 |
| Compound (6) | 3 | 3 | 3 | 3 |
| Silica powder | 50 | 50 | 50 | 50 |
| Specific gravity (25° C). | 1.44 | 1.46 | 1.42 | 1.45 |
| Hardness* | 28 | 35 | 33 | 15 |
| Elongation (%) | 200 | 140 | 120 | 100 |
| Tensile strength (kgf/cm$^2$) | 25 | 24 | 18 | 7 |
| Adhesion strength under shear | 7 | 10 | 6 | 1 |
| Volumn change (%) | 20 | 3 | 5 | 28 |

*Hardness was measured using an A-type spring hardness tester according to JIS K-6301.

The adhesive composition of the present invention described above has good adhesive properties and good solvent resistance to gasoline or the like. The composition is very useful in uses such as automobile parts in which the cured product thereof may frequently come into contact with such a solvent.

What is claimed is:

1. An adhesion composition comprising:
(A) a fluorosilicone polymer containing the unit having the following formula (1):

$$Rf CH_2CH_2(CH_3)SiO— \qquad (1)$$

wherein Rf is a perfluoroalkyl group containing 1 to 8 carbon atoms, in an amount of 30 mol % or more on average in the molecule, blocked with the vinyl group at both ends of the molecular chain, and having a viscosity at 25° C. of 1,000 to 100,000 cSt, (B) a fluorosilicone polymer containing the unit having the formula (1) in an amount of 30 mol % or more on average in the molecule, containing an average of 3 or more units having the following formula (2):

$$CH_2=CH(CH_3)SiO— \qquad (2),$$

having an average polymerization degree of 10 or more, the average polymerization degree being defined as the number of SiO units contained in the molecule, and having a viscosity at 25° C. of 10 cSt or more but less than 1,000 cSt, (C) an organohydrogenpolysiloxane other than (D) having an average of 2 or more of silicon-bonded hydrogen atoms, (D) an organosilane or organopolysiloxane having at least one hydrogen atom or alkenyl group bonded to a silicon atom and having at least one group selected from the group consisting of the oxirane group, dialkoxysilyl groups and trialkoxysilyl groups in the molecule, and (E) platinum or a platinum compound.

2. The composition according to claim 1, wherein the fluorosilicone polymer of the component (A) comprises at least one compound selected from the group consisting of the compounds represented by the formulas (3) to (6):

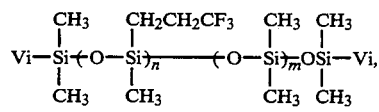  (3)

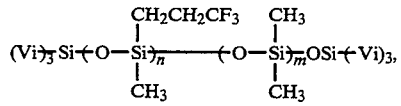  (4)

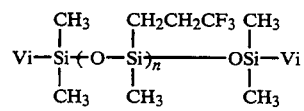  (5)

and

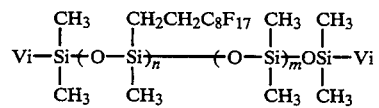  (6)

wherein in the formulas above n and m denote(s) an integer of 1 or more.

3. The composition according to claim 1, wherein the fluorosilicone polymer of the component (B) is present in an amount of 1 to 30 parts by weight per 100 parts by weight of the fluorosilicone polymer of the component (A).

4. The composition according to claim 1, wherein the fluorosilicone polymer of the component (B) comprises at least one compound selected from the group consisting of the compounds represented by the formulas (8) to (10):

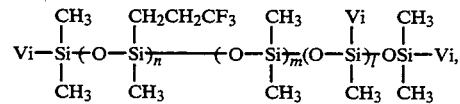  (8)

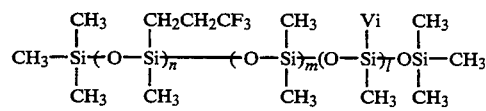  (9)

and

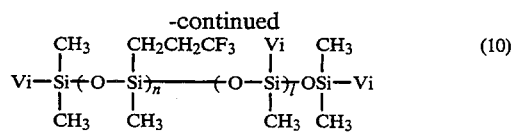  (10)

wherein in the formulas above n and m are an integer of 1 or more, and l is an integer of 3 or more.

5. The composition according to claim 1, wherein the component (C) is present in an amount of 0.5 parts by weight per 100 parts by weight of the component (A).

6. The composition according to claim 1, wherein the component (D) is present in an amount of 0.1 to 30 parts by weight per 100 parts by weight of the component (A).

7. The composition according to claim 1, wherein the components (C) and (D) are present in such amounts that the total of the Si—H groups contained in the components (C) and (D) is 0.5 to 4.0 mol per mol of the entire alkenyl groups contained in the composition.

8. The composition according to claim 1, wherein the component (D) comprises at least one compound selected from the group consisting of the compounds represented by the formulas (21) to (33):

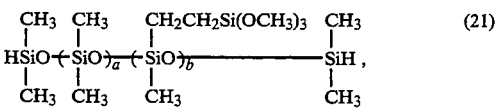  (21)

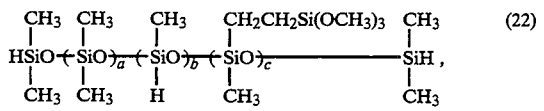  (22)

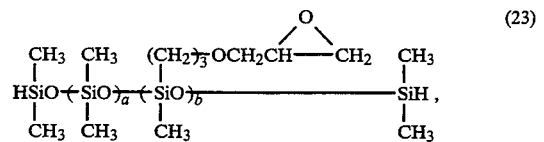  (23)

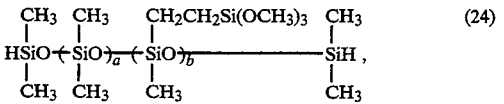  (24)

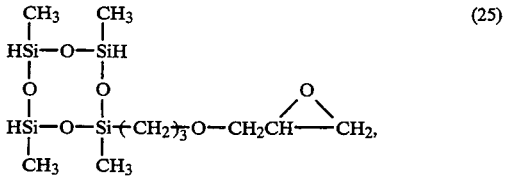  (25)

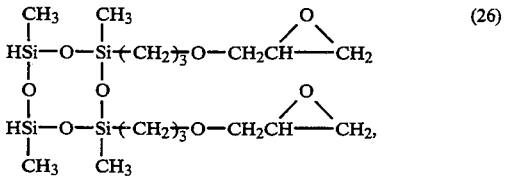  (26)

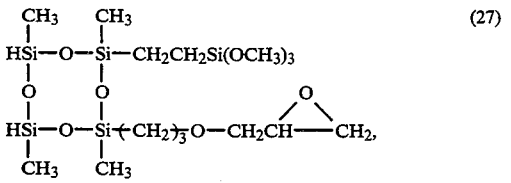  (27)

-continued
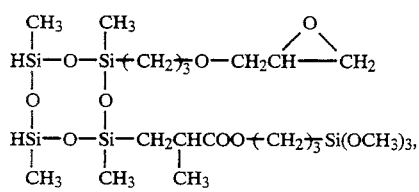
(28)
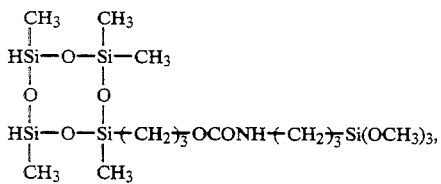
(29)
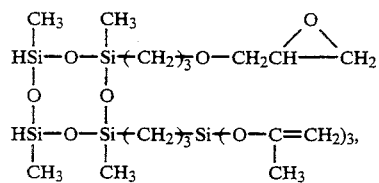
(30)
-continued
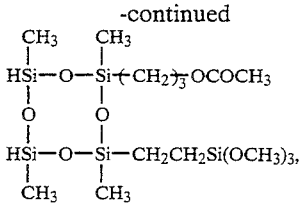
(31)
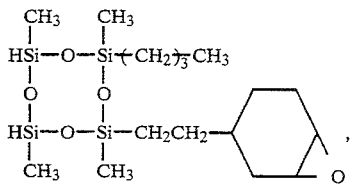
(32)
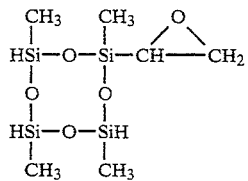
(33)
wherein a, b and c are each an integer of 1 or more.
9. A cured product obtained by curing the composition as claimed in claim 1.
* * * * *